April 8, 1969   D. E. UFFORD   3,437,161
KART BOARD
Filed Oct. 2, 1967
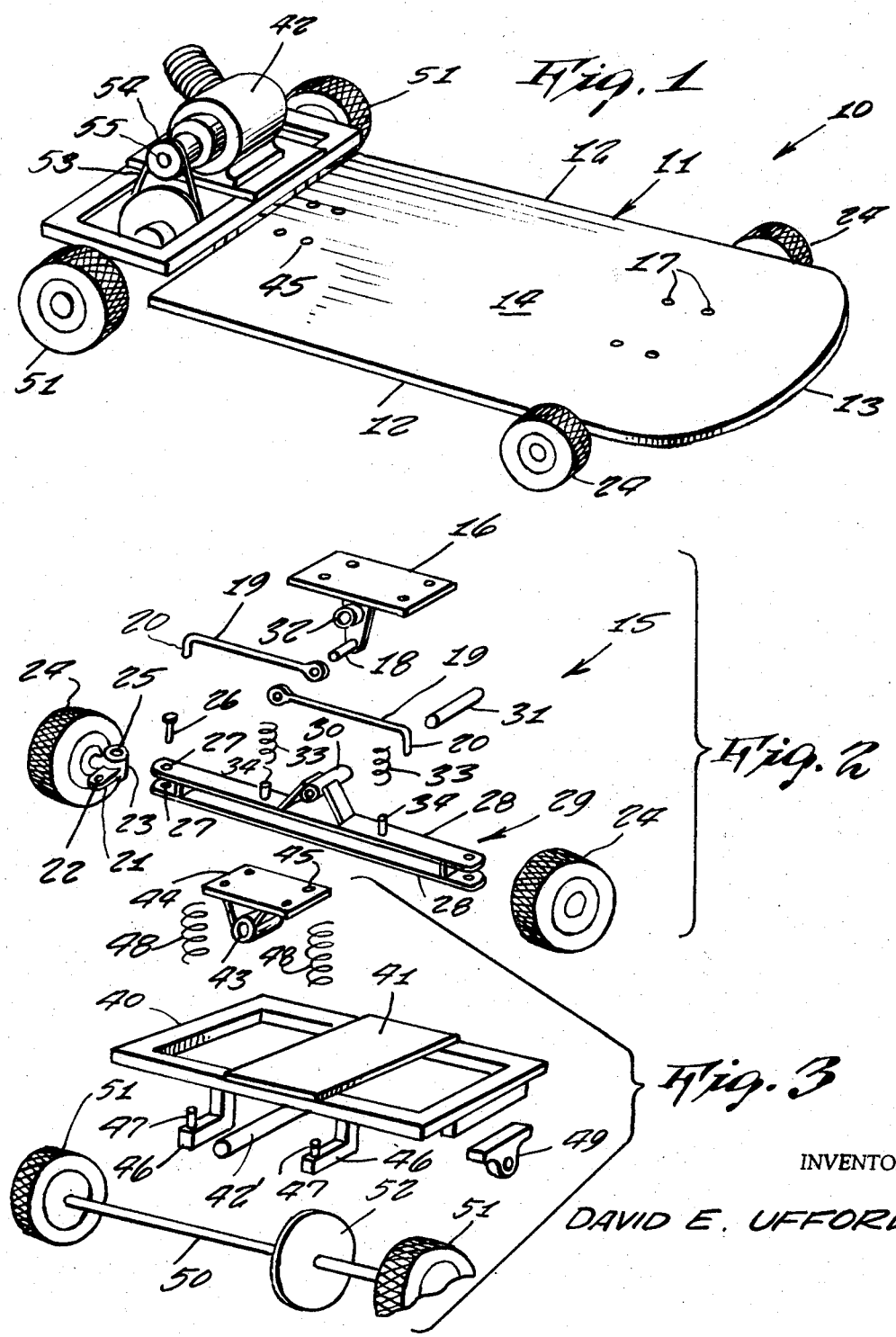
INVENTOR
DAVID E. UFFORD

United States Patent Office 3,437,161
Patented Apr. 8, 1969

3,437,161
KART BOARD
David E. Ufford, Hudson, Iowa
(132 W. Mayne St., Blue Grass, Iowa 52726)
Filed Oct. 2, 1967, Ser. No. 672,084
Int. Cl. A63c 17/12; B60k 9/00
U.S. Cl. 180—1                                    2 Claims

ABSTRACT OF THE DISCLOSURE

A riding device of the class of surf-boards and skate-boards, and upon which a rider may stand, the device including a flat panel, a front axle and steering assembly, and a rear drive assembly including an engine driving a pair of rear wheels.

---

This invention relates generally to vehicles of the type of skate-boards and go-carts which require skill to ride.

A principal object of the present invention is to provide a kart board vehicle of go-cart or skate-board class which includes a surface upon which a rider may be carried, and which further includes an engine for delivering driving power to a pair of rear wheels.

Another object of the present invention is to provide a kart-board upon which a rider may stand during travel of the vehicle and wherein the rider may steer the same by shifting his weight toward the right or left, thus tilting the board to cause the device to turn rightward or leftward.

Yet a further object of the present invention is to provide a kart board wherein the propelling engine is similar to a go-cart except that high speed or high horsepower is not a prime factor of importance.

Other objects of the present invention are to provide a kart board which is simple in design, inexpensive to manufacture, rugged in construction, easy to use and efficient in operation.

These and other objects will become apparent upon a study of the following specification and the accompanying drawing wherein:

FIGURE 1 is a perspective view of the kart board vehicle;

FIGURE 2 is an exploded perspective view of the parts that comprise the front axle and steering assembly;

FIGURE 3 is an exploded perspective view of the parts that comprise the rear axle and drive.

According to the drawing, reference numeral 10 represents a kart board wherein there is a horizontal panel 11 having the general shape of a surf board and which includes parallel side edges 12 and a rounded forward edge 13, the panel having a generally flat upper surface 14.

A front axle and steering assembly 15 is mounted upon the underside of the panel 11, the parts of which are shown in detail in FIGURE 2.

The front axle and steering assembly include a bracket 16 which is secured by means of rivets or screws 17 to the underside of the panel 14, the bracket 16 including a steering pin 18 upon which there are mounted a pair of linkage rods 19 which extend generally horizontal and have a downwardly turned end 20 that is receivable within an opening 21 on a sidewardly extending lug 22 that is integral with a bearing 23 of a wheel 24. The bearing 23 has an opening 25 extending vertically therethrough for receiving a pin 26 fitted through openings 27 of parallel, spaced apart bars 28 that form an axle assembly 29, the axle assembly 29 supporting integral therewith a sleeve 30 that receives a pivot pin 31 having an end thereof fitted into a bushing 32, carried on the bracket 16. It is to be noted that both wheels 24 are of light construction, having the bearing 23 and sidewardly extending lug 21 with opening 22 therein, for receiving an end of the linkage rod.

A pair of compression coil springs 33 have a lower end thereof fitted on posts 34 of the axle assembly, the compression coil springs 33 extending upwardly to bear against the underside of the bracket 16 or the underside of the panel 11, thus when the panel is not tilted the springs maintain the axle assembly in equilibrium position, to cause the vehicle to travel straight forwardly.

The drive assembly, illustrated in FIGURE 3 of the drawing, as well as in FIGURE 1, is shown to include a frame 40 upon which there is carried an engine mount 41 for supporting engine 42, the frame 40 supporting a pivot shaft therebelow as identified by the reference numeral 42', the pivot shaft being receivable within a bearing opening 43 of a bracket 44 that is securable by means of bolts or rivets 45 to the underside of the panel 11, the frame further having a pair of horizontal brackets 46 integral therewith, each bracket having a spring holder 47 for supporting the lower end of a compression coil spring 48, the upper end of which bears against the under side of panel 11. A pair of bearing brackets 49 are mounted upon the underside of the frame 40, the bearing brackets supporting the rear shaft 50 having wheels 51 thereupon and a drive chain sprocket 52 that is connected by a drive chain 53 to a drive sprocket 54 mounted on a shaft 55 of a clutch assembly that is engageable with the motor shaft.

The engine's electrical system can be equipped with a two conductor electrical cord with button switch at one end and the other end connected to short circuit the engine's electrical system when the button is released. This same type control could be located upon the board so that when the operator's weight is off, the switch stops the engine. A narrow platform could be built over the engine and drive sprocket for safety purposes and so to let the operator start in a sitting position thereon while the throttle is adjusted and the cart is brought up to speed. The engine may be provided wih a muffler to keep the noise level low enough to permit its use in populated areas. The present kart board could be used for competitive sport with obstacle courses, endurance races, skating maneuvers, and the like.

The drive assembly may be made detachable with a special hinge pivot bracket, that would clamp to the back of a sled, and permit this drive unit to propel a sled over ice or hard snow. The wheels could be equipped with a set of small tire chains or wrapped with wire or rope for additional traction. The drive unit, thus propelling a sled, would permit its use in winter sports, fishing or racing.

The present device could be sold as a complete unit, as a conversion unit to existing cart owners, as a drive unit with or without a sled for winter use or sold without engine for those who have an engine.

I claim:

1. In a kart board, the combination of a flat, horizontal panel upon which a rider may stand, said panel having parallel side edges, a rounded forward edge, a flat upper side, said panel being supported at its forward end upon a flat axle and steering assembly, and supported at its rear end upon a rear axle and drive assembly, said front axle and steering assembly including a bracket secured to the underside of said panel, a horizontal extending pin carried by said bracket and longitudinally disposed relative to said kart board, a pair of linkage rods, adjacent ends of said linkage rods being pivotally free on said pin, the opposite ends of said linkage rods being free, a pair of wheel bearings, each bearing including a sidewardly extending lug, the free ends of said rods being pivotally secured to a corresponding one of said lugs, each said wheel bearing having a vertically extending opening, a vertically extending pin at each end of said axle assembly and received in a corresponding one of said vertical openings, said axle assembly including a horizontally extending sleeve having an axis transverse of said assembly, a bar, a bushing secured to said bracket and having an axis extending parallel to and vertically spaced from said horizontal pin, one end of said bar being pivotally supported in said sleeve and the other end of said bar being pivotally supported in said bushing, whereby said axle oscillates about the axis of said bushing, and a compression coil spring on each side of said sleeve and disposed between the upper side of said axle assembly and the under side of said platform.

2. The combination as set forth in claim 1 wherein said axle and drive assembly includes a frame and bracket means, said bracket means mounted on the under side of said panel and having a horizontal extending opening disposed longitudinally of said kart board, a pivot shaft secured to the under side of said frame and received in said last mentioned opening, said frame having a pair of L-shaped arms, a pair of compression coil springs, the lower ends of said coil springs being supported by said arms, the upper ends of said compression coil springs bearing against the under side of said platform, a pair of bearing blocks on the underside of said frame supporting said rear axle, a pair of rear wheels on said rear axle, a driven chain sprocket carried by said rear axle, a motor mounted upon said frame and including a clutch controlled shaft, a drive sprocket on said shaft, and a drive chain connecting said drive and driven sprockets.

References Cited

UNITED STATES PATENTS 2,659,584  11/1953  Dorkins _____ 130—1 X

A. HARRY LEVY, *Primary Examiner.*

U.S. Cl. X.R.

180—11; 280—112, 79.1